3,243,308
AMYLOSIC FILMS AND METHOD OF MAKING
THE SAME
John W. Barger and William J. Haggerty, Jr., Kansas
City, Mo., assignors to Department of Agriculture and
Inspection of the State of Nebraska, Lincoln, Nebr.
No Drawing. Filed Oct. 23, 1963, Ser. No. 318,159
18 Claims. (Cl. 106—213)

This application is a continuation-in-part of our earlier copending application, Serial No. 159,752, filed December 15, 1961, now abandoned.

This invention relates to strong, flexible, self-supporting films manufactured from amylosic materials and to a new method of producing the same.

Transparent, flexible, potentially edible and water soluble film would be extremely desirable as a packaging material and would have numerous different applications. Starch is a cheap raw material in abundant supply, but it is known that satisfactory films cannot be prepared with this material because of lack of flexibility and tensile strength. Heretofore, film formation by the use of amylose, the linear fraction of most starches, has been suggested but invariably those proposed techniques have involved solution of the amylose in a liquid carrier and subsequent regeneration of the amylose as a film by conventional procedures. The films resulting from such processes have been often deficient in tensile strength, flexibility and transparency.

We have now discovered a new method of preparing strong flexible, transparent films from amylosic solid materials in a relatively simple and rapid manner. Basically, our method involves the conversion of amylosic solid materials into a plastic extrudable mass with the aid of limited quantities of water, and then extruding the plastic mass into a film before the mass sets into a permanent shape or configuration. Accordingly, we have found that amylosic solid materials can, at high temperatures and super atmospheric pressures, and in the presence of less than the minimum quantity of water required to completely dissolve all of the solid material, be converted into a homogeneous viscous plastic mass and that this plastic mass can be easily extruded into strong, flexible, transparent films, potentially water soluble and edible. The best results, it has been found, are achieved by maintaining a temperature differential between the temperature of conversion into the plastic mass and the temperature of extrusion. Thus, with the limited quantities of water which are used in the composition to be extruded, we use high temperatures and hold the composition under confinement at super atmospheric pressures to convert it into a homogeneous plastic mass. Then, preferably, we reduce the temperature of the composition shortly before or at the time of extrusion in order to obtain transparent, flexible films which possess high strength, homogeneity and stability.

The reasons why best results are achieved by maintaining these conditions in carrying out the method of the invention are not completely understood. However, it seems likely that since less water is used than the amount required to dissolve all of the amylosic solid material in the composition, the conversion of the solid material at high temperatures and pressures into a homogeneous extrudable plastic mass is achieved through a mechanism involving something more than mere solubilization. Perhaps in the environment of high temperatures and pressures, much of the amylosic solids material dissolves while the remainder melts or is assimilated in some form of eutectic mixture in which all solid components are liquefied. We also believe that carrying out the extrusion at lower temperatures results in a reduction of the mobility of the highly plastic extrudable mass as a preliminary matter and the mass is thereby oriented in the desired film shape before it has had the opportunity to reach the greatest degree of immobilization at ordinary room temperatures. These explanations are our presently-favored viewpoints based on the facts at hand, but they have by no means been conclusively proven and other reasons may later be shown to account for the advantages derived by maintaining the particular conditions described in carrying out the method of the invention.

In forming extrudable compositions in accordance with the invention, various types of amylosic solid materials may be used. For example, pure amylose or amylose derivatives such as hydroxyethyl amylose and amylose ethers, esters and anhydrides may be employed. Also, there are now commercially available certain forms of starch containing high amounts of amylose, anywhere from 55% to 75%, and any of such starches may be used for extruded self-supporting films in accordance with our process. Of course, the foregoing amylosic materials may be used alone or in mixture with each other or with other materials, and where mixtures are employed, the weight of pure amylose or amylose derivatives should constitute at least 50% of the total weight of the mixture. Accordingly, as used in this specification and in the appended claims, the terms "amylosic material" and "amylosic solid material" are defined to mean any mixture of film-forming solids which includes at least 50% by weight of pure amylose or amylose derivatives such as hydroxyethyl amylose, and amylose ethers, esters and anhydrides.

As previously mentioned, the amylosic composition to be extruded as a self-supporting film also contains water in less than the minimum amount required to dissolve all of the amylosic solid material. This means that the composition will not contain more than about 50% by weight of water. The amount of water may vary down to about 20% by weight where the composition is to contain only the amylosic solid material and water. On the other hand, where separately-added plasticizing agents are used, the amount of water can be further reduced down to about 5% by weight and preferably 10%. The water is adsorbed by the amylosic solid material and the composition has the physical form of a free-flowing pourable batch of solid particles prior to heating and extrusion. The water undoubtedly acts not only as a partial solvent for the amylosic material at the time of extrusion, but as a lubricant and flow-improving agent as well.

As pointed out, the amylosic solid material composition to be extruded may contain additional compatible plasticizers both for improving the extrusion characteristics and the physical properties of the final film product. The plasticizers which may be employed are organic compounds containing at least one hydroxy group per molecule and preferably polyhydric alcohols of which glycerine is a preferred example. Other plasticizers which may be used include invert sugars, corn syrup, di-sorbitol ethylene glycol, di-ethylene glycol, propylene glycol and homologues thereof, hydroxypropyl glycerines and other hydroxyalkyl partial esters of polyhydric alcohols. These plasticizers are used in conjunction with water in the extrusion composition, and in all cases some water must be present. Accordingly, the amount of plasticizer to be used will vary from zero to approximately 30% by weight.

Depending on the particular application of the self-supporting films, other optional ingredients such as coloring agents, preservatives, such as calcium propionate, bactericides, flavor extracts and even dehydrated food particles may be included in the extrusion composition so as to be incorporated in the final self-supporting film.

From the foregoing, it will be noted that the compositions formed for the purpose of extrusion into self-supporting films may contain from about 50% to about 95% by weight of amylosic solid material at least half the weight of which, by definition, consists of pure amylose or an amylose derivative, from about 5% to about 50% by weight of water and from zero to about 30% by weight of a compatible plasticizer.

In accordance with the invention, the compositions described above are subjected to high temperatures and pressures for conversion into a homogeneous plastic mass which can be extruded. Generally speaking, the temperatures best suited for this conversion are from about 250° F. to about 360° F. and preferably from about 300 to 350° F. At temperatures exceeding about 360° F., we have found that there is a tendency toward charring and carmelization of the plastic mass and this, of course, should be avoided in order to form films of good appearance and physical characteristics. On the other hand, at temperatures below about 250° F., the conversion of the initial composition into a homogeneous plastic mass is not fully accomplished and in most cases the individual parts of granules of the amylosic solid material remain intact and become incorporated in any film that may be extruded. This, of course, is undesirable and detracts both from the appearance and from the desired physical characteristics of the film.

In heating the composition to the high temperatures mentioned above, it is preferred, that the elevation of temperature be carried out in at least two adjacent stages or heating zones. It has been found that this multi-stage heating process will improve the extrudability of the composition as well as the characteristics of the film product. For the multi-stage heating embodiment, it is preferred that the composition be raised to a temperature of from about 150 to 180° F. in a first zone and thereafter to the higher temperatures of 260 to 360° F. in a second zone. The fact of the composition passing through the two heating stages apparently is the important attribute which leads to better results. Although in most cases the multi-stage heating embodiment yields improved results, with some particular amylosic compositions there is little discernible difference between heating the composition to the high temperatures all at once, or doing it in stages.

In heating the amylosic compositions to the high temperatures mentioned, we have found it necessary to confine the composition under a pressure above atmospheric pressure. Undoubtedly one reason for this is that the composition contains a limited amount of water and a pressurized system is necessary in order to maintain the balance of proportions between water and the amylosic solid materials. Moreover, confinement under elevated pressure is necessary to convert all of the amylosic solid material into a viscous plastic mass because at least to a partial degree melting of the amylosic material, or the formation of an eutectic mixture, or some similar phenomenon defintely seems to be involved. In carrying out the method of our invention, we have found that there is a wide range in the super atmospheric pressures under which the extrudable composition may be confined and generally speaking such pressures may range anywhere above atmospheric to about 2,000 p.s.i. or even higher. Preferably the pressure of confinement will be within the range from about 250 to about 600 p.s.i. and the composition may be held in any pressurized chamber for the purpose of confinement just before it is extruded.

In extruding the composition after it has been converted into the homogeneous plastic mass, we have found that best results are achieved by cooling the composition to a temperature within the range of 150 to 210° F., and preferably 170° to 210° F., either just before, or during emission of the self-supporting film from the extrusion orifice or flat die. At temperatures in excess of about 210° F., there is a tendency toward excessive water loss in the film by rapid or "flash" vaporization and this may cause an undesirable formation of bubbles or even tearing in the newly-extruded film. On the other hand, at temperatures below about 150° F., the composition may exhibit "channeling" whereby unequal flow across the entire width of the film emitted from the extrusion orifice will cause an undesirable non-uniform appearance and consistency as well as a non-uniform thickness in the areas where excessive material has sagged and collected from the channeling effect. Apparently, the step of reducing the temperature of the plastic extrusion mass at the time of extrusion gives a preliminary setting or orientation in the film being emitted and this imparts the desired film configuration or shape prior to reaching the final setting stage and the attendant limits of elasticity and flexibility at ordinary room temperatures.

The extrusion of the compositions described above can be carried out in conventional extrusion equipment. For example, we have done extensive work with a standard screw extruder equipped with a center-fed flat film die having a width of 6 inches. A 1 inch diameter screw extruder was employed with a screw design having a compression gain of 1.5 to 1 and the flow along the length of the screw was 20 inches. The die head was set at openings ranging from 0.001 to 0.004 inch with screw speeds of 40 to 150 r.p.m. The die head can be equipped with any form of cooling means to reduce the temperature of the plastic extrusion mass as it is extruded out between the lands of the die.

The plastic extrusion mass is emitted from the extrusion orifice or flat die in the form of a self-supporting film which is highly elastic and somewhat tacky when first emitted. The term self-supporting means that a continuous ribbon or sheet of uniform composition is emitted from the extrusion orifice or flat die in the shape of a film which is capable of supporting its own weight over a substantial distance, at least one foot, out from the orifice or flat die without breaking, tearing or otherwise losing its continuity. The film is preferably taken up on heated rolls which may be maintained at temperatures from about 125 to 200° F. for removing excess moisture from the film by evaporation. The specific temperature of the heated rolls will depend primarily on the thickness of the self-supporting film, the extrusion temperatures reached and the formulation of the extrusion composition, particularly the amount of water.

As mentioned previously, the self-supporting film emitted from the extrusion die is highly elastic and can, if desired, be stretched either in the direction parallel with the extrusion axis or normal to the axis. Where the film is not stretched, an isotropic product is obtained having high tensile strength which on the average is substantially the same in all directions through the film plane. On the other hand, the film may be and is desirably stretched by tension derived, for example, from an increased speed of takeup of the heated rolls and the stretch factor may range up to about 5.0. That is to say, the film may be stretched up to five times its original length as emitted from the extrusion orifice or flat die. Particularly when the film is stretched, we have found that a considerable degree of orientation is achieved in the amylosic materials incorporated in the film. This orientation apparently is one in which the long linear molecules of amylose are aligned parallel with the extrusion axis since the tensile strength parallel with the extrusion axis in the stretched films will be greater on the average than the tensile strength normal to the extrusion axis.

Generally speaking, films formed in accordance with the present invention can be obtained in which the tensile strength parallel to the extrusion axis is greater than the tensile strength across the extrusion axis. We have found in our work that the tensile strength parallel to the extrusion axis varied in different films from about 6000 to 9000 p.s.i. while the tensile strength across the extrusion axis in the respective films varied from about 5600 to 8400 p.s.i. In all cases the difference in tensile strength taken parallel and across the extrusion axis in the same sample of film was from about 400 to 600 p.s.i. The films also will have an elastic modulus of 150,000 to 250,000 p.s.i. and elongation of from 4 to 20%.

Where high amounts of water have been used in preparing amylosic solid material composition for extrusion, it is preferable to reduce the moisture content in the final, self-supporting film to within the range from about 7 to 15% by weight. With loss of water, the physical properties of the film will gradually change over a period of storage. A arnge of 7 to 15% by weight of water is the equilibrium content that is preferable and the temperature of the rolls upon which the self-supporting film is taken up can be adjusted as required to stabilize the moisture content to within the range specified.

The films obtained in accordance with the invention are generally transparent, quite flexible and have extremely high strength as previously described. The films have many applications as food packaging materials, as pharmaceutical wrappings and in other applications conventional in the art. Depending on the ingredients selected, the films can be made water soluble and edible and these products are of particular utility in drop-in-and-dissolve packages containing food, detergents and measured quantities of other materials. Generally speaking, the films should be confined to a thickness within the range from about 1 to 10 mils and preferably from about 1 to 3 mils.

Further details of the invention will be illustrated by the following examples which represent preferred embodiments. All proportions given therein are by weight unless otherwise indicated.

EXAMPLE 1

In this example 54% of pure amylose, 6% of glycerine, and 40% of water were mixed to form a free-flowing solid material. The composition was fed into the extrusion equipment described previously and heated to a temperature of 340° F. at a pressure of about 600 p.s.i. The composition was then cooled to approximately 200° F. and extruded into a self-supporting film approximately 6 mils thick and then stretched by a factor of about 2.7. The final film had the following physical properties:

Tensile strength _____ p.s.i.__ 7,000
Elastic modulus _____ p.s.i.__ 195,000
Elongation _____ percent__ 12

EXAMPLE 2

A composition of amylose and water was prepared, without use of any plasticizer, for extrusion into a self-supporting film. The composition was prepared by mixing 54% of amylose with 46% of water to form a free-flowing particulate mixture.

The composition was fed into the extrusion equipment described previously and heated in two stages first at 170° F. and then to 310° F. The pressure at the higher temperature was approximately 500 p.s.i. Thereafter the composition was cooled to approximately 200° F. and extruded into a self-supporting film about 2.5 mils thick. The film was not stretched but collected in the form emitted from the die. The resulting film was edible and had the following physical properties:

Tensile strength _____ p.s.i.__ 7,600
Elastic modulus _____ p.s.i.__ 245,000
Elongation _____ percent__ 9

EXAMPLE 3

In this example a composition was prepared for extrusion by mixing 54% of amylose with 6% of invert sugar and 40% of water.

The composition was heated in the equipment mentioned above to a temperature of 350° F. under a pressure of about 400 p.s.i. The composition was then cooled to approximately 190° F. and extruded into a self-supporting film without stretching. The resulting film was edible and had the following physical properties:

Tensile strength _____ p.s.i.__ 8,200
Elastic modulus _____ p.s.i.__ 225,000
Elongation _____ percent__ 12

EXAMPLE 4

In this example a composition plasticized with corn syrup was prepared for extrusion by mixing 54% of amylose with 6% of corn syrup and 40% of water. The composition was fed into the extrusion equipment mentioned above and heated to a temperature of about 275° F. under a pressure of 550 p.s.i. The composition was then cooled to 195° F. and extruded into a film about 4 mils thick. In taking up the film from the extrusion die, the film was stretched by a factor of about 1.6. The resulting edible film had the following physical properties:

Tensile strength _____ p.s.i.__ 8,500
Elastic modulus _____ p.s.i.__ 235,000
Elongation _____ percent__ 10

EXAMPLE 5

A self-supporting film was extruded from a composition made by mixing 54% of amylose with 6% of d-sorbitol and 40% of water. This composition was fed into the extrusion equipment mentioned previously and heated therein to a temperature of approximately 310° F. under a pressure of about 2,000 p.s.i. Thereafter the composition was cooled at 210° F. and extruded without stretching into a transparent, flexible self-supporting film. The resulting edible film had the following physical properties:

Tensile strength _____ p.s.i.__ 7,300
Elastic modulus _____ p.s.i.__ 200,000
Elongation _____ percent__ 11

EXAMPLE 6

In this example self-supporting films were prepared using as a compatible plasticizer a mixture of hydroxypropyl glycerines sold commercially under the trade name "Hyprin GP 25" by the Dow Chemical Company. These materials have an average substitution of 2.5 hydroxypropyl groups per glycerine unit.

A composition was prepared by mixing 54% amylose with 6% of the hydroxypropyl glycerines and 40% of water.

A self-supporting film was formed from this composition in the manner described for the previous examples and during take up the film was stretched by a factor of 2.2. The resulting film had the following physical properties:

Tensile strength _____ p.s.i.__ 8,000
Elastic modulus _____ p.s.i.__ 203,000
Elongation _____ percent__ 4½

EXAMPLE 7

In this example a self-supporting film was formed by use of hydroxyethyl amylose in place of pure amylose. The mixture for extrusion was prepared by mixing 66% of hydroxyethyl amylose with 7% of glycerine and 27% of water. After extrusion of this composition into a self-supporting film in the manner previously described and including stretching by a factor of 2.4, the resulting product had the following physical properties:

Tensile strength _____ p.s.i.__ 6,000
Elastic modulus _____ p.s.i.__ 158,000
Elongation _____ percent__ 19.5

EXAMPLE 8

In this example a self-supporting film was formed using a commercially available high amylose starch containing about 55 to 65% of amylose and the balance amylopectin and other residues normally found in such starches. A composition was prepared by mixing 59% of the high amylose starch with 6% of glycerine and 35% of water.

After extrusion of this composition without stretching into a film as previously described, the resulting edible film had the following physical properties:

Tensile strength _____ p.s.i.__ 6,600
Elastic modulus _____ p.s.i.__ 176,000
Elongation _____ percent__ 12

EXAMPLE 9

In this example a self-supporting film was prepared using a mixture of substantially pure amylose and amylopectin premixed in the dry in a proportion of six parts amylose to one part amylopectin. A mixture was prepared for extrusion by mixing together 48% of amylose and 8% of amylopectin and then mixing these dry ingredients with 6% of glycerine and 38% of water. After extrusion into a self-supporting film in the manner previously described, the resulting edible film had substantially the same physical properties as those given in the preceding example.

EXAMPLE 10

In this example a self-supporting film was prepared by use of a mixture of substantially pure amylose and a commercially available starch having a 55 to 65% amylose content. The composition was prepared for extrusion by first mixing 33½% of amylose with 22½% of the high amylose content starch and then mixing this permixture with 6% of glycerine and 38% of water.

After extrusion of the composition into a self-supporting film as previously described, and stretching by a factor of 1.6, the resulting edible film had the following following physical properties:

Tensile strength _____p.s.i.____ 7,800
Elastic modulus _____p.s.i.__ 198,000
Elongation _____percent__ 12

EXAMPLE 11

In this example a modified starch containing about 70% amylose and 30% amylopectin and derivatized with hydroxypropyl groups was used in forming a self-supporting film. A composition for extrusion was prepared by mixing 62% of the modified high amylose starch with 8% of glycerine and 30% of water.

The composition was extruded into a self-supporting film in the manner previously described and stretched by a factor of 4. In measuring the physical properties of the resulting film, the measurements were taken both parallel and normal to the extrusion axis. The results were as follows:

|  | Parallel to Extrusion Axis | Normal to Extrusion Axis |
| --- | --- | --- |
| Tensile strength, p.s.i. | 5,500 | 5,000 |
| Elastic modulus, p.s.i. | 145,000 | 126,000 |
| Elongation, percent | 9 | 4½ |

As will be noted, in the sketched film a definite orientation of the amylose molecules was achieved whereby the tensile strength, elastic modulus and elongation of the self-supporting film in the direction parallel with the extrusion axis were significantly higher than the same properties across the width of the film, in a direction normal to the extrusion axis.

EXAMPLE 12

In this example the physical properties of films produced in accordance with this invention were compared with solvent cast amylose films of generally the same physical composition. Extruded films were produced by the method of the invention using as the extrusion composition a commercially available high amylose starch, glycerine and water. In the final film product, the proportions of these ingredients were about 81.7% high amylose starch, 10.5% glycerine and 7.8% water.

For the solvent cast films, a mixture of the same ingredients was employed and this mixture was dissolved in a sufficient quantity of water to form a castable solution and thereafter films were cast upon glass plates and dried in conventional manner. In the cast films, the final proportions were about 82.1% high amylose starch, 10.6% glycerine and 7.3% water.

The physical properties of both the extruded and solvent cast films were measured. Measurements in only one direction were made for the solvent cast film since these films were not stretched so that no differentials of orientation were achieved therein.

The results of these tests are as given in the following table:

Tensile strength p.s.i.
(A) Extruded film:
  Parallel to extrusion axis _____ 6,330
  Normal to extrusion axis _____ 5,740
(B) Solvent cast film _____ 5,070

Elastic modulus (A) Extruded film
  Parallel to extrusion axis _____ 155,000
  Normal to extrusion axis _____ 152,000
(B) Solvent cast film _____ 140,000

Elongation

Percent
(A) Extruded film
  Parallel to extrusion axis _____ 9.0
  Normal to extrusion axis _____ 3.6
(B) Solvent cast film _____ 5.2

As will be seen, the extruded films produced in accordance with the method of the invention were quite superior to the solvent cast films. The tensile strengths and elastic moduli of the former were greater than the latter in all cases and the elongation of the solvent cast film was intermediate the elongations of the extruded film in the two directions parallel and normal to the extrusion axis.

All data presented herein above as to tensile strength, extrusion modulus and elongation were obtained on an Instron tester and tensile tests were made according to Method B of A.S.T.M. D882-49T testing procedure.

It will be understood that it is intended to cover all changes and modifications of the preferred embodiment of the invention herein chosen for the purpose of illustration which do not constitute departures from the spirit and scope of the invention.

We claim:

1. The method of manufacturing amylosic starch films which comprises forming a composition comprising amylosic solid materials and an amount of water not in excess of about 50% by weight of said composition, heating said composition under pressure at a temperature of at least about 250° F. to convert it into a homogeneous plastic mass and then extruding said mass as a self-supporting film at a temperature not over about 210° F.

2. The method of manufacturing amylosic films which comprises forming a composition comprising from about 50% to about 80% by weight of amylosic solid materials and from about 20% to about 50% by weight of water, heating said composition to a temperature of from about 250° F. to about 360° F. while holding it under confinement at super atmospheric pressures, cooling said composition to a temperature of from about 150° F. to about 210° F. and extruding said composition into a self-supporting film.

3. The method as in claim 2 which includes the step of adding to said composition, prior to the heating thereof, up to about 30% by weight of a compatible plasticizer having at least one alcoholic hydroxyl group.

4. The method as in claim 2 which includes the step of reducing the moisture content of said self-supporting film to within the range from about 7% to about 15% by weight.

5. The method as in claim 2 which includes the step of stretching said self-supporting film permanently by a factor between about 1.0 to about 5.0.

6. The method as in claim 2 wherein said composition is confined under a pressure of from about 250 p.s.i. to about 2,000 p.s.i.

7. The method of manufacturing amylosic films which comprises forming a composition comprising from about 50% to about 95% by weight of amylosic solid materials, from about 5% to about 50% by weight of water and up to about 30% by weight of a compatible plasticizer having at least one alcoholic hydroxyl group, heating said composition to a temperature of from about 250° F. to about 360° F. while holding it under confinement at super atmospheric pressures, cooling said composition to a temperature of from about 150° F. to about 210° F. and extruding said composition into a self-supporting film.

8. The method as in claim 7 which includes the step of reducing the moisture content of said self-supporting film to within the range from about 7% to about 15% by weight.

9. The method as in claim 7 which includes the step of stretching said self-supporting film permanently by a factor between about 1.0 to about 5.0.

10. The method as in claim 7 wherein said composition is confined under a pressure of from about 250 p.s.i. to about 2,000 p.s.i.

11. The method as in claim 7 wherein said heating is carried in two stages, the first at temperatures from about 150° F. to about 180° F. and the second at temperatures from about 260° F. to about 360° F.

12. The method as in claim 7 wherein said amylosic solid materials are selected from the group consisting of pure amylose, starches containing at least 50% by weight of amylose, hydroxyethyl amylose, amylose ethers, amylose esters, amylose anhydrides and mixtures thereof.

13. The method as in claim 7 wherein said compatible plasticizer is glycerine.

14. The method as in claim 7 wherein said compatible plasticizer is corn syrup.

15. The method as in claim 7 wherein said compatible plasticizer is an invert sugar.

16. The method as in claim 7 wherein said compatible plasticizer is d-sorbitol.

17. The method as in claim 7 wherein said compatible plasticizer is an hydroxypropyl glycerine.

18. An article of manufacture comprising a flexible self-supporting starch film containing at least about 50% by weight of amylosic materials extruded at a temperature not over about 210° F. from a hot melt held under pressure at a temperature of at least about 250° F. which film has a thickness within the range of about 1 to about 10 mils and a tensile strength of at least 5500 p.s.i.

References Cited by the Examiner

UNITED STATES PATENTS

| | | | |
|---|---|---|---|
| 2,132,724 | 10/1938 | Dalton | 106—162 |
| 2,570,449 | 10/1951 | Horsak | 264—211 |
| 3,043,720 | 7/1962 | Anderson et al. | 106—162 |
| 3,071,485 | 1/1963 | Wurzburg et al. | 106—213 |
| 3,117,014 | 1/1964 | Klug | 106—213 |
| 3,117,021 | 1/1964 | Klug. | |
| 3,137,592 | 6/1964 | Protzman et al. | 264—186 |

OTHER REFERENCES

Sherman v. Sherman, The New Fibers, D. Van Nostrand Co., Inc., New York, 1946, TS1540.S5, page 7.

ALEXANDER H. BRODMERKEL, *Primary Examiner.*

ROBERT F. WHITE, *Examiner.*

K. W. VERNON, A. L. LEAVITT, *Assistant Examiners.*